(12) United States Patent
BenHanokh et al.

(10) Patent No.: US 10,102,147 B1
(45) Date of Patent: Oct. 16, 2018

(54) PHASED BASED DISTRIBUTED LRU FOR SHARED CACHE SYSTEMS

(71) Applicant: EMC Corporation, Hopkinton, MA (US)

(72) Inventors: Gabriel BenHanokh, Tel Aviv (IL); Andrew Chanler, Berlin, MA (US); Felix Shvaiger, Brighton, MA (US); Hongliang Tang, Hopkinton, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 315 days.

(21) Appl. No.: 15/188,006

(22) Filed: Jun. 21, 2016

(51) Int. Cl.
*G06F 12/00* (2006.01)
*G06F 12/123* (2016.01)
*G06F 12/084* (2016.01)

(52) U.S. Cl.
CPC .......... *G06F 12/123* (2013.01); *G06F 12/084* (2013.01); *G06F 2212/1041* (2013.01); *G06F 2212/281* (2013.01); *G06F 2212/69* (2013.01)

(58) Field of Classification Search
CPC ................. G06F 12/123; G06F 12/084; G06F 2212/1041; G06F 2212/281; G06F 2212/69
See application file for complete search history.

(56) References Cited

U.S. PATENT DOCUMENTS

| 2016/0217077 A1* | 7/2016 | Ambroladze ....... G06F 12/0855 |
| 2016/0266844 A1* | 9/2016 | Ogawa ................ G06F 12/0808 |
| 2017/0017576 A1* | 1/2017 | Cammarota ............. G06N 5/04 |

\* cited by examiner

*Primary Examiner* — Reginald Bragdon
*Assistant Examiner* — Mehdi Namazi
(74) *Attorney, Agent, or Firm* — Anderson Gorecki LLP

(57) ABSTRACT

In a system in which a plurality of computing elements share a cache, each computing element owns a stripe of the cache. Each stripe contains cache objects that are accessible to all computing elements but managed only by the owning computing element. Each computing element maintains an LRU FIFO queue in local memory for the cache objects owned by that computing element. Each computing element also maintains a separate hash table in local memory for each other computing element. The hash tables indicate access to cache objects that are owned by those other computing elements. Each computing element updates its LRU FIFO queue when it accesses cache objects that it owns. The hash tables are periodically distributed by all computing elements via RDMA so that the LRU FIFO queues of all computing elements can be updated based on accesses to owned cache objects by other non-owner computing elements.

20 Claims, 5 Drawing Sheets

US 10,102,147 B1

PHASED BASED DISTRIBUTED LRU FOR SHARED CACHE SYSTEMS

BACKGROUND

The subject matter of this disclosure is generally related to systems that use shared cache, including but not limited to data storage systems that maintain large data sets and support multiple host applications and concurrent users. A data storage system may include multiple storage arrays. Each storage array may include a shared cache and multiple computing nodes that manage access to tangible data storage devices. The storage array presents one or more logical production volumes of storage to host applications running on a host. The host applications access the production volumes by sending IOs to the storage array. The computing nodes use the shared cache to temporarily store data that is being copied between the host and the tangible data storage devices.

SUMMARY

All examples, aspects and features mentioned in this document can be combined in any technically possible way.

In accordance with an aspect an apparatus comprises: a plurality of computing nodes, each computing node comprising a processor and a local cache; a shared cache that is accessible to the computing nodes, the shared cache having a plurality of ownership areas, each ownership area comprising cache objects owned by one of the computing nodes; each computing node comprising, in the local cache, a first data record indicative of relative temporal proximity of most recent access of each cache object owned by that computing node; each computing node comprising, in the local cache, a second data record indicative of access by that computing node to cache objects owned by others of the computing nodes; each computing node comprising logic that distributes at least some access information from the second data record to the other computing nodes; and each computing node comprising logic that updates the first data record based on access information from second data records received from the other computing nodes. In some implementations the logic that distributes access information from the second data record to the other computing nodes performs distribution once per a temporal phase. In some implementations the temporal phase has a duration that is less than a fall-through time of the shared cache. In some implementations each computing node clears the second data record in local cache after distribution to the other computing nodes. In some implementations the first data record comprises a least recently used first-in-first-out queue. In some implementations the second data record comprises a separate hash table for each of the other computing nodes. In some implementations each hash table is hashed on cache object ID. In some implementations ownership of the cache objects is determined using modulo arithmetic. In some implementations the ownership areas comprise stripes. In some implementations the shared cache comprises allocated portions of the local caches of the computing nodes, and wherein the ownership areas are the allocated portions.

In accordance with an aspect a method comprises: in a system comprising a plurality of computing nodes, each computing node comprising a processor and a local cache, and a shared cache that is accessible to the computing nodes, the shared cache having a plurality of ownership areas, each ownership area comprising cache objects owned by one of the computing nodes: each computing node generating, in the local cache, a first data record indicative of relative temporal proximity of most recent access of each cache object owned by that computing node; each computing node generating, in the local cache, a second data record indicative of access by that computing node to cache objects owned by others of the computing nodes; each computing node distributing at least some access information from the second data record to the other computing nodes; and each computing node updating the first data record based on access information from second data records received from the other computing nodes. In some implementations the method comprises distributing the access information from the second data record to the other computing nodes once per a temporal phase. In some implementations the method comprises setting a duration of the temporal phase to be less than a fall-through time of the shared cache. In some implementations the method comprises each computing node clearing the second data record in local cache after distribution to the other computing nodes. In some implementations the method comprises generating the first data record as a least recently used first-in-first-out queue. In some implementations the method comprises generating the second data record as a separate hash table for each of the other computing nodes. In some implementations the method comprises hashing each hash table on cache object ID. In some implementations the method comprises determining ownership of the cache objects using modulo arithmetic. In some implementations the method comprises generating the ownership areas as stripes. In some implementations the shared cache comprises allocated portions of the local caches of the computing nodes, and the method comprises forming the ownership areas as the allocated portions.

DETAILED DESCRIPTION

Some aspects, features and implementations described herein may include machines such as computer devices, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, multiple virtual computing devices could operate simultaneously on one physical computing device. The term "logic" is used to refer to special purpose physical circuit elements and software instructions that are stored on a non-transitory computer-readable medium and implemented by multi-purpose tangible processors.

Figure 1:
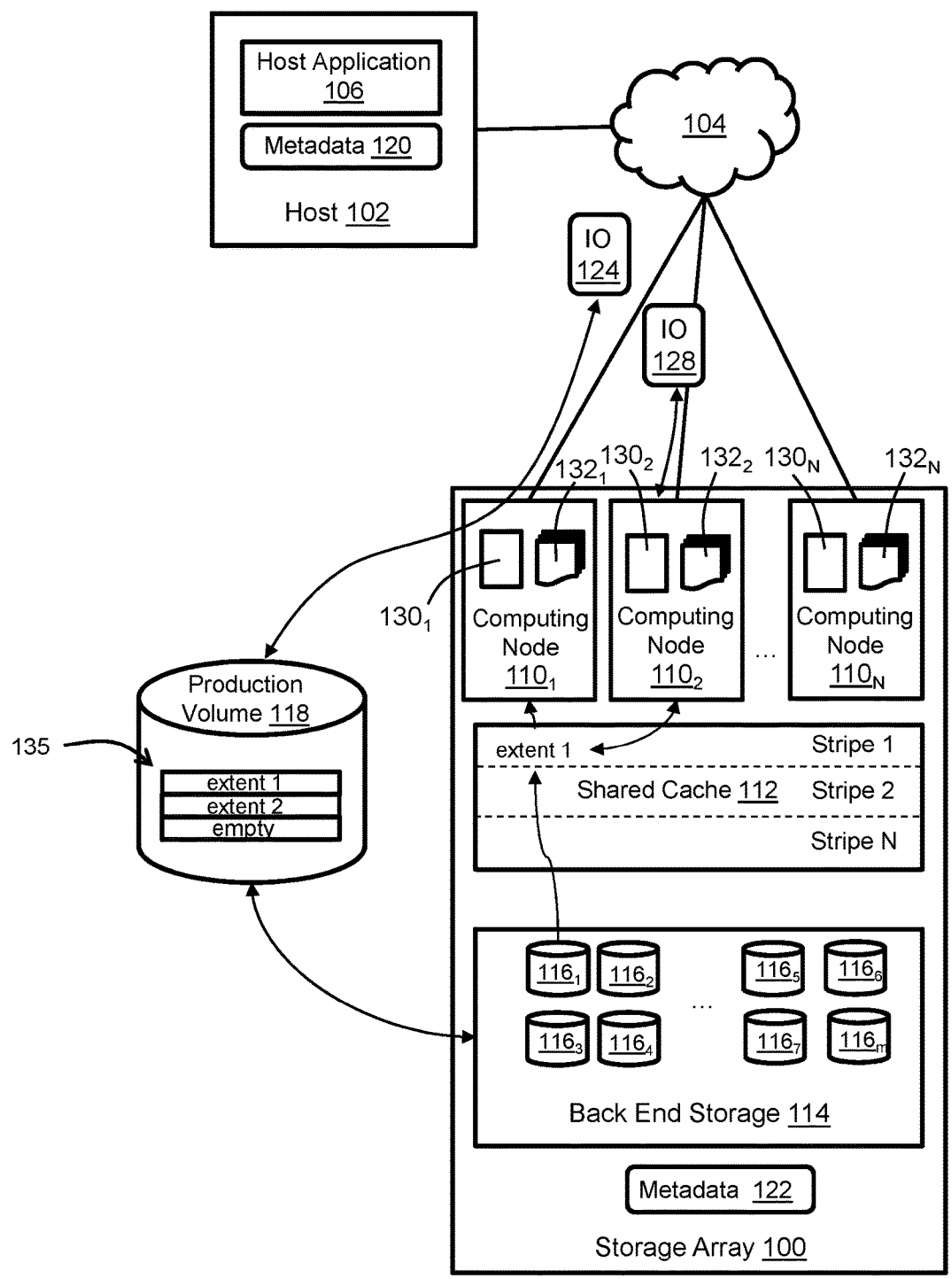
FIG. 1 illustrates an exemplary data storage system.

FIG. 1 illustrates an exemplary data storage system. Although the illustrated data storage system includes a single data storage array 100 and a single external host 102, any number of hosts and data storage arrays could be included in the data storage system. The host 102 is connected to the storage array 100 via a network 104. The network 104 may include various types of network nodes, e.g. switches, routers, hubs, and other network devices, and may include one or more of the Internet, a WAN (wide area network), MAN (metropolitan area network), LAN (local area network), and SAN (Storage Area Network). The host 102 uses storage services provided by the storage array 100 via the network 104.

The host 102 may include a tangible server computer with memory, storage and processors. The host might also include a virtual host running on a virtual machine or container using processing and memory resources of a tangible server computer. Although an external host 102 is illustrated, internal hosts may be instantiated within the storage array 100. The host 102 operates a host application 106 that utilizes storage services provided by the storage array 100. There may be any number of host applications running on the host. Examples of host applications include but are not limited to a database, file server and block server.

The storage array 100 includes N interconnected computing nodes $110_1$-$110_N$, a shared cache 112 and back end storage 114. The computing nodes, shared cache and back end storage may be, but are not necessarily, located in the same geographic location and may be located within the same chassis or rack. The computing nodes $110_1$-$110_N$ may include "vanilla" storage server computers and specialized computer hardware platforms including but not limited to storage directors that are specifically designed for use in storage arrays. The shared cache may include a wide variety of types of RAM (random access memory) and high performance SSDs (solid state devices). Back end storage 114 includes tangible data storage devices $116_1$-$116_m$, which may include HDDs (hard disk drives) and SSDs, for example and without limitation.

The computing nodes $110_1$-$110_N$ maintain at least one logical production volume 118 that is backed by the tangible data storage devices $116_1$-$116_m$. Without limitation, the production volume may be referred to as a production LUN or host LUN, where LUN (logical unit number) is a number used to identify the logical storage volume in accordance with the SCSI (small computer system interface) protocol. The production volume 118 represents an abstraction layer between the back end storage 114 and the host 102. From the perspective of the host 102 the production volume 134 is a single data storage device having a set of contiguous fixed-size LBAs (logical block addresses) on which data used by the host application resides, as described by host metadata 120. However, the data used by the host application may actually be maintained by the computing nodes at non-contiguous addresses on various different tangible storage devices of the back end storage. The storage array maintains metadata 122 indicative of the locations of extents of data on the tangible storage devices. Consequently, the computing nodes can use the metadata 122 to determine the actual location of data on the tangible data storage devices $116_1$-$116_m$ based on a reference to the production volume 118 in an IO from the host 102 based on host metadata 120.

Data associated with the servicing of an IO from the host is temporarily stored in the shared cache 112. For example, if computing node $110_1$ is servicing an IO 124 that contains a request to read data extent 1 from production volume 118 then the computing node $110_1$ uses the metadata 122 to find the location of extent 1 in back end storage 114, e.g. on data storage device $116_1$, and prompts extent 1 to be copied from data storage device $116_1$ to the shared cache 112. For purposes of explanation it is assumed that a "cache miss" occurs, i.e. that extent 1 is not already present in the shared cache 112 when IO 124 is received. The computing node then accesses the cached copy of extent 1 in order to return a copy of extent 1 to the host application 106 in order to service the read request of IO 124. The computing node may use a RDMA (remote direct memory access) operation to access the copy of extent 1 in the shared cache. In another example, if IO 124 contains a request to write extent 1 to production volume 118 then the computing node $110_1$ copies extent 1 from the IO 124 into the shared cache 112, e.g. using an RDMA operation. The computing node then uses the metadata 122 to find the location of extent 1 (or a location for new extent 1) on data storage device $116_1$ in back end storage 114. The copy of extent 1 may reside in the shared cache 112 for some period of time but is eventually destaged (moved) from the shared cache to back end storage. For purposes of explanation it is again assumed that a cache miss occurs, i.e. that extent 1 is not already present in the shared cache when IO 124 is received. A cache hit occurs when extent 1 is already present in the shared cache when an associated IO is received. For example, an IO 128 with a request to read or write extent 1 may be received by computing node $110_2$ after extent 1 has been copied to the shared cache by computing node $110_1$. In this case the copy of extent 1 in the shared cache is used to service the IO 128 without accessing back end storage 114. For example, the copy of extent 1 in shared cache may be copied or overwritten depending on whether IO 128 contains a request to read or write.

Although a shared cache may provide some advantages in storage arrays and other systems, management of a shared cache may also present some complications. Cache management includes decisions regarding the selection of extents to be evicted from the shared cache. Extents may need to be evicted from the cache for various reasons, including but not limited to making space available for other extents that are required to service IOs. For example, if the shared cache is full and an extent needs to be copied to shared cache in order to service an IO then some data is evicted from the shared cache to provide the necessary space. In a non-shared cache it is generally known to implement an LRU algorithm that tracks and evicts the least recently used data. However, implementing such an algorithm in a remote shared cache would require multiple serial remote memory accesses between computing nodes and the shared cache. Such accesses may be orders of magnitude slower than accesses to local cache. Further, there would be an increased risk of creating a disjoint list of recently used data because there are multiple computing nodes sharing the cache. Tag based solutions in which timestamps are associated with accessed extents may be less susceptible to disjoint list problems. Each computing node can retrieve and sort a set of timestamps in order to calculate a least recently used extent of data when eviction is required. However, retrieving and sorting timestamped records is computationally costly.

Figure 2:
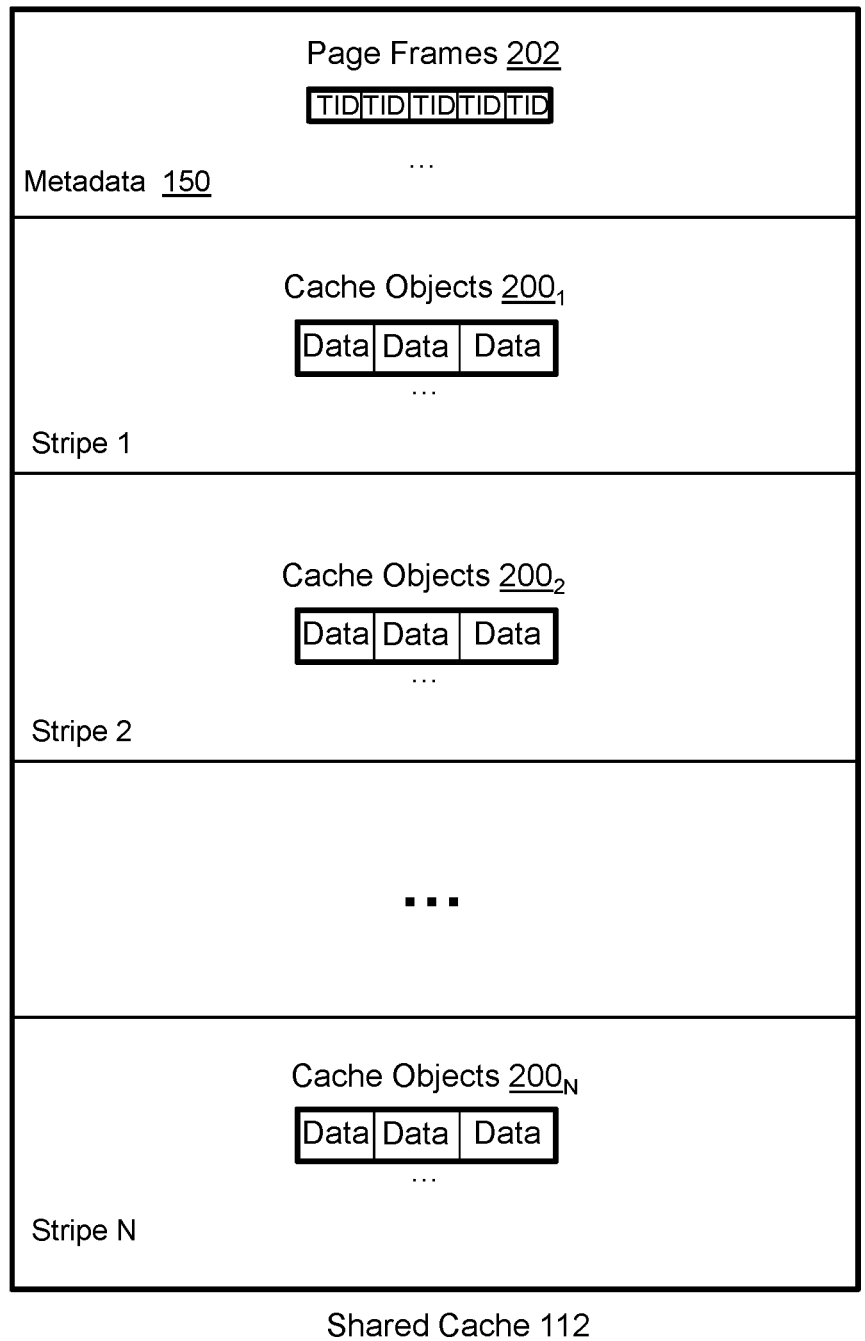
FIG. 2 illustrates the shared cache of the storage array in greater detail.

Referring to FIGS. 1 and 2, the shared cache 112 of storage array 100 is organized into multiple ownership areas for data eviction purposes. For example, the ownership areas may be address range stripes labelled as stripe 1 through stripe N that correspond to the N computing nodes labelled $110_1$ through $110_N$. The ownership areas may be of equal size and are not necessarily stripes. Each stripe includes cache objects that may be used to store extents of data, e.g. fixed size cache slots, without limitation. Each computing node has exclusive management authority for a corresponding stripe of the shared cache. Consequently, computing node $110_1$ owns cache objects $200_1$, computing node $110_2$ owns cache objects $200_2$ and computing node $110_N$ owns cache objects $200_N$. When an extent of data needs to be evicted from a stripe of the shared cache, the computing node that owns that stripe selects a cache object in that stripe and the data in the selected cache object is evicted. In other words, each ownership area is an exclusive eviction domain for one and only one of the computing nodes that share the cache. The shared cache 112 may also include objects that store metadata. In the illustrated example the objects that store metadata are fixed size page frames 202. Each page frame may contain multiple TIDs (track ID tables) that include pointers to the extents of data in the cache slots of all stripes.

Figure 3:
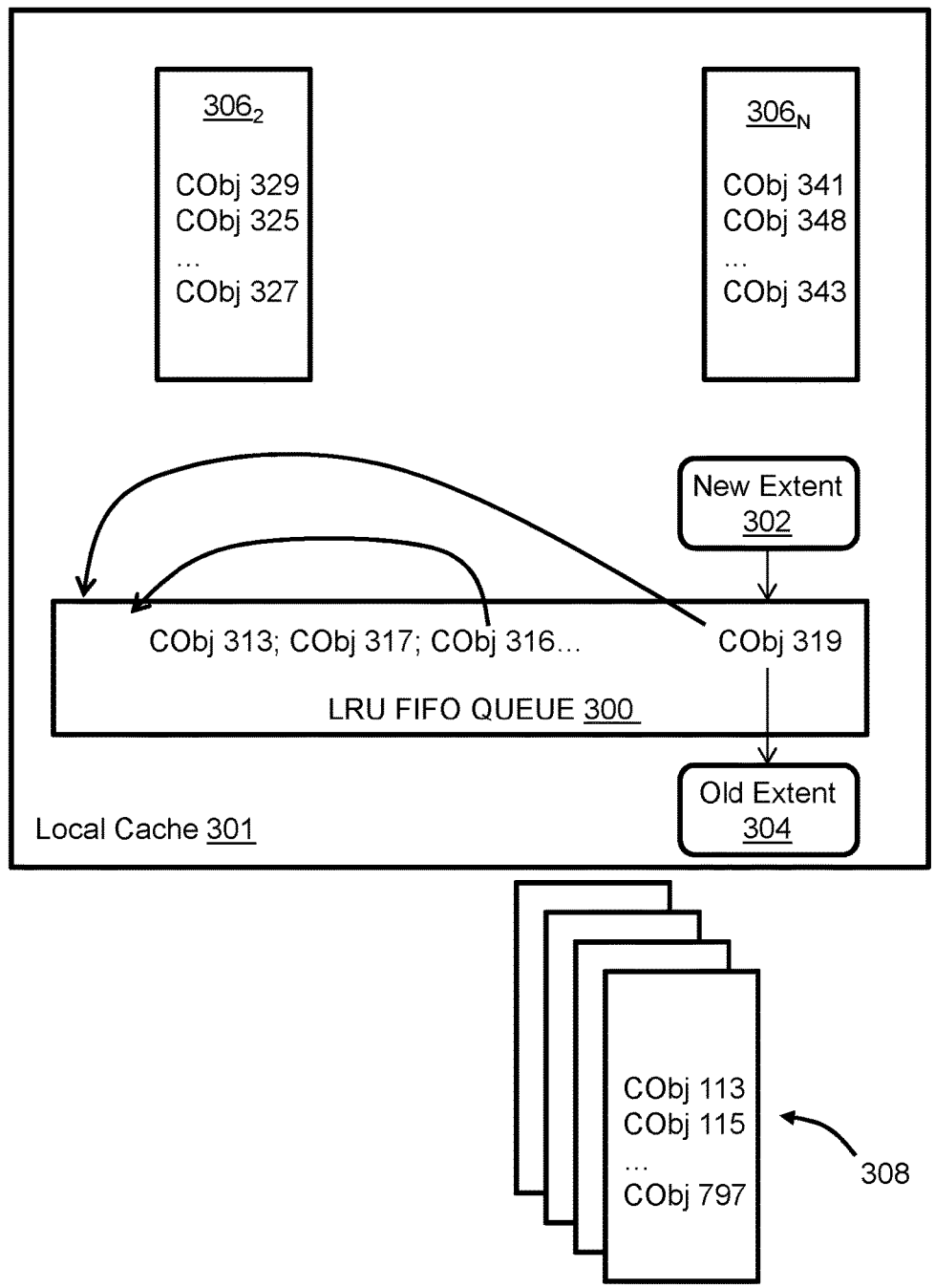
FIG. 3 illustrates an LRU FIFO queue and hash tables that are maintained by the computing nodes for phased distributed management of the shared cache.

Referring to FIGS. 1 and 3, in order to select data for eviction purposes each computing node $110_1$ through $110_N$ maintains a respective data record $130_1$ through $130_N$ that indicates the temporal proximity of most recent access of each cache object relative to other cache objects in the stripe managed by that computing node. The data records may include LRU (least recently used) FIFO (first-in-first-out) queues that are maintained locally by each respective computing node, e.g. in volatile memory such as a local cache 301. In the illustrated example LRU FIFO queue 300 corresponds to the data record $130_1$ that is maintained by computing node $110_1$ in local memory 301 to indicate relative temporal proximity of most recent access of each cache object in stripe 1. The LRU FIFO queue 300 need not necessarily indicate how recently each cache object was accessed or when it was accessed. For example and without limitation, the LRU FIFO queue may indicate an order of most recent accesses of cache objects relative to other cache objects in the stripe. In the illustrated example cache object 319 initially contains the least recently accessed data and cache object 313 initially contains the most recently accessed data. When the data in cache object 316 is subsequently accessed the LRU FIFO queue 300 is updated to indicate that cache object 316 is the most recently accessed cache object. When the need for a free cache object occurs, e.g. for new extent 302, the old extent 304 that occupies the least recently accessed cache object 319 as indicated by the LRU FIFO queue is evicted from the shared cache and the new extent is copied into the now available cache object 319. The LRU FIFO queue is then updated to indicate that cache object 319 is the most recently accessed cache object in stripe 1. The LRU FIFO queue, or other data structure serving the purpose, may be updated by adding or changing pointers. Because the LRU FIFO queue may be maintained in memory that is local to the associated computing node, updates to the LRU FIFO queue are fast and efficient in comparison with RDMA operations needed for global cache LRU management. Further, ownership of stripes may help to avoid the disjoint list problem.

The LRU FIFO queue for a given computing node may be updated periodically based on accesses to the owned cache objects by other computing nodes. Each computing node $110_1$ through $110_N$ maintains a respective set $132_1$-$132_N$ of N−1 data records that indicates accesses by that computing node to extents in cache objects owned by other computing nodes. The sets of per-stripe data records $132_1$-$132_N$ may include hash tables that are hashed on cache object ID. In the example shown in FIG. 3 computing node $110_1$ uses local cache 301 to maintain N−1 hash tables $306_2$ through $306_N$ corresponding to stripe 2 through stripe N owned by computing nodes $110_2$ through $110_N$. Each hash table may include a record of each cache object in the respective stripe that has been accessed. When a computing node accesses a cache object it determines which computing node is the owner of the cache object, e.g. using modulo arithmetic that distributes ownership of cache objects pseudo-randomly. If the cache object doesn't exist in the hash table then the computing node creates a new entry. If the cached object does exist in the hash table then no action is required because a cache object need only be included once in a hash table even if the corresponding data was accessed multiple times. The record of cache objects in the hash tables need not necessarily be ordered, e.g. organized based on relative temporal proximity of most recent access. The hash tables are distributed via RDMA to the corresponding computing nodes at different points in time in order to prompt update of the LRU FIFO queues maintained by other computing nodes. For example, computing node $110_1$ sends hash table $306_2$ to computing node $110_2$ and sends hash table $306_N$ to computing node $110_N$. Computing node $114_1$ also receives hash tables 308 from other computing nodes. The received hash tables 308 indicate cache objects accessed in stripe 1 by computing nodes other than computing node $110_1$. The received hash tables 308 are used by computing node $110_1$ to update the local LRU FIFO queue 300. Consequently, both hash table generation and LRU FIFO queue update are performed efficiently in local cache, and slower RDMA is used for periodic distribution of aggregated cache object access information.

Figure 4:
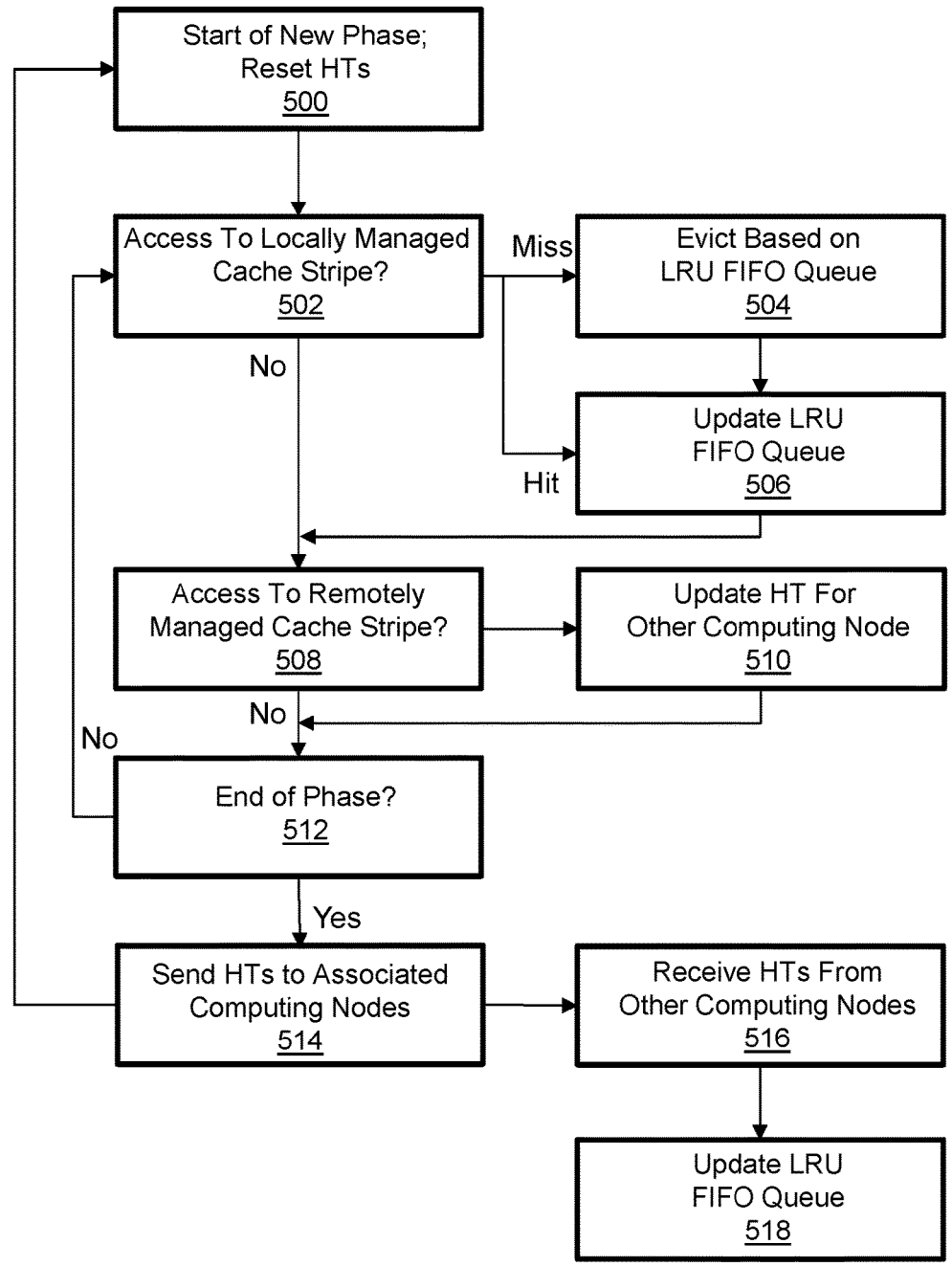
FIG. 4 illustrates a technique for phased distributed management of the shared cache.

FIG. 4 illustrates a technique for maintaining the local LRU FIFO queues and hash tables. The technique may be implemented in parallel by each computing node in the storage array. For example, the technique may be implemented by instances of logic in each computing node using local non-transitory memory and processors. The computing node may begin a new update phase as indicated in block 500. The phase may be temporal or triggered based on a condition. The duration of the phase may be selected or calculated based on "fall-through time," which is the period of time an extent will, on average, exist in the cache before being evicted. In general the duration of the phase is selected to be less than the fall-through time, e.g. some fraction or percentage thereof. Logic can monitor to determine whether and when the computing node accesses the locally managed cache stripe as indicated at block 502. For example, computing node $110_1$ (FIG. 1) may access stripe 1. This may occur repeatedly and in any order with respect to the other illustrated actions during a phase. If an individual access to the locally managed cache stripe, i.e. to a cache object owned by computing node $110_1$ (FIG. 1), in block 502 results in a cache miss then, assuming the stripe is full, the computing node selects the least recently used cache object in the LRU FIFO queue and evicts the extent stored therein in order to free space for a new extent. The LRU FIFO queue is then updated as indicated in block 506 to indicate that the selected cache object is now the most recently used cache object. If the access in block 502 results in a cache hit then the LRU FIFO queue is updated as shown in block 506 to indicate that the corresponding cache object is now the most recently used cache object. Logic can monitor to determine whether the computing node accesses a remotely managed cache stripe, i.e. a cache object owned by a different computing node, as indicated at block 508. For example, computing node $110_1$ may access a cache object in stripe 2. This may occur repeatedly and in any order with respect to the other illustrated actions during a given phase. In response, the computing node $110_1$ updates the locally maintained hash table for the remotely managed cache stripe, i.e. the hash table for the other computing node, as indicated in block 510. Functions associated with blocks 502 and 508 can occur any number of times and in any order until the end of the phase is reaches as determined in block 512. In response to the end of the phase shown in block 512, the computing node sends the respective hash tables to the associated computing nodes as indicated at block 514. For example, the hash table that indicates accesses to cache objects in stripe 2 is sent to computing node $110_2$ and the hash table that indicates accesses to cache objects in stripe N is sent to computing node $110_N$. The hash tables in local memory are reset (cleared) after being distributed to the other computing nodes in preparation for the start of the next new phase as indicated in block 500. Contemporaneously, or in temporal proximity, the computing node receives a separate hash table from each of the other computing nodes as indicated in block 516. In response, the computing node updates the LRU FIFO queue based on the accesses to cache objects in stripe 1 by the other computing nodes as listed in the received hash tables as shown in block 518. The update may occur after a new phase has begun.

Figure 5:
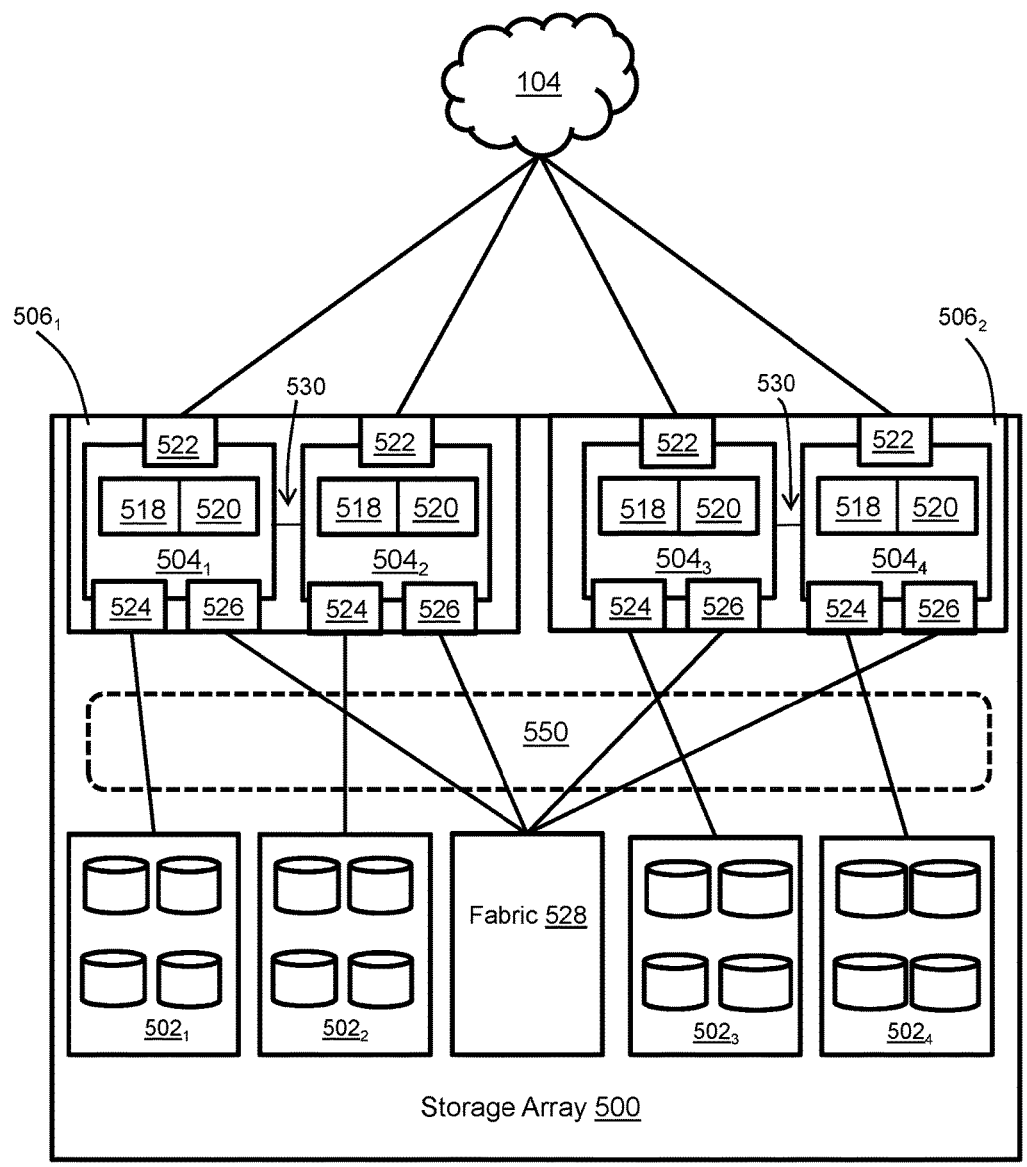
FIG. 5 illustrates another data storage array in which phased distributed management of the shared cache may be implemented.

FIG. 5 illustrates another exemplary data storage array 500. Back end storage includes sets of managed drives $502_1$-$502_4$, each associated with one computing node. Pairs of computing nodes $504_1$, $504_2$ and $504_3$, $504_4$ may be organized as storage engines $506_1$, $506_2$, respectively. The paired computing nodes of a storage engine may be directly interconnected by communication links 530. Each computing node includes at least one tangible multi-core processor 518 and a local cache 520. The local cache 520 may include, for example and without limitation, volatile memory components such as RAM and non-volatile memory components such as high performance SSDs. Each computing node may include one or more FEs (front-end directors, aka front end adapters) 522 for communicating with the host, cloud storage, other storage arrays and other devices that can be reached via the network 104. Each computing node may also include one or more BEs (back end directors, aka back end adapters) 524 for communicating with its associated managed drives. Each computing node may also include one or more CAs (channel directors, aka channel adapters) 526 for communicating with other computing nodes via interconnecting fabric 528. Each computing node may allocate a portion or partition of its respective local cache 520 to a virtual shared cache 550 that can be accessed by other computing nodes, e.g. via DMA (direct memory access) or RDMA (remote direct memory access). In this implementation the stripe that is owned by each computing node may be the portion or partition of local cache that the computing node allocates to the virtual shared cache.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
    a plurality of computing nodes, each computing node comprising a processor and a local cache;
    a shared cache that is accessible to the computing nodes, the shared cache having a plurality of ownership areas, each ownership area comprising cache objects owned by one of the computing nodes;
    each computing node comprising, in the local cache, a first data record indicative of relative temporal proximity of most recent access of each cache object owned by that computing node;
    each computing node comprising, in the local cache, a second data record indicative of access by that computing node to cache objects owned by others of the computing nodes;
    each computing node comprising logic that distributes at least some access information from the second data record to the other computing nodes; and
    each computing node comprising logic that updates the first data record based on access information from second data records received from the other computing nodes.

2. The apparatus of claim 1 wherein the logic that distributes access information from the second data record to the other computing nodes performs distribution once per a temporal phase.

3. The apparatus of claim 2 wherein the temporal phase has a duration that is less than a fall-through time of the shared cache.

4. The apparatus of claim 2 wherein each computing node clears the second data record in local cache after distribution to the other computing nodes.

5. The apparatus of claim 1 wherein the first data record comprises a least recently used first-in-first-out queue.

6. The apparatus of claim 1 wherein the second data record comprises a separate hash table for each of the other computing nodes.

7. The apparatus of claim 6 wherein each hash table is hashed on cache object ID.

8. The apparatus of claim 1 wherein ownership of the cache objects is determined using modulo arithmetic.

9. The apparatus of claim 1 wherein the ownership areas comprise stripes.

10. The apparatus of claim 1 wherein the shared cache comprises allocated portions of the local caches of the computing nodes, and wherein the ownership areas are the allocated portions.

11. A method comprising:
    in a system comprising a plurality of computing nodes, each computing node comprising a processor and a local cache, and a shared cache that is accessible to the computing nodes, the shared cache having a plurality of ownership areas, each ownership area comprising cache objects owned by one of the computing nodes:
    each computing node generating, in the local cache, a first data record indicative of relative temporal proximity of most recent access of each cache object owned by that computing node;

each computing node generating, in the local cache, a second data record indicative of access by that computing node to cache objects owned by others of the computing nodes;

each computing node distributing at least some access information from the second data record to the other computing nodes; and each computing node updating the first data record based on access information from second data records received from the other computing nodes.

12. The method of claim 11 comprising distributing the access information from the second data record to the other computing nodes once per a temporal phase.

13. The method of claim 12 comprising setting a duration of the temporal phase to be less than a fall-through time of the shared cache.

14. The method of claim 12 comprising each computing node clearing the second data record in local cache after distribution to the other computing nodes.

15. The method of claim 11 comprising generating the first data record as a least recently used first-in-first-out queue.

16. The method of claim 11 comprising generating the second data record as a separate hash table for each of the other computing nodes.

17. The method of claim 16 comprising hashing each hash table on cache object ID.

18. The method of claim 11 comprising determining ownership of the cache objects using modulo arithmetic.

19. The method of claim 11 comprising generating the ownership areas as stripes.

20. The method of claim 11 wherein the shared cache comprises allocated portions of the local caches of the computing nodes, and comprising forming the ownership areas as the allocated portions.

* * * * *